US007908665B2

(12) United States Patent
Chase

(10) Patent No.: US 7,908,665 B2
(45) Date of Patent: Mar. 15, 2011

(54) CLOAKED DATA OBJECTS IN AN ELECTRONIC CONTENT MANAGEMENT SECURITY SYSTEM

(75) Inventor: Michael Chase, Madison Heights, MI (US)

(73) Assignee: AUTODESK, Inc, San Rafael, CA (US)

( * ) Notice: Subject to any disclaimer, the term of this patent is extended or adjusted under 35 U.S.C. 154(b) by 1449 days.

(21) Appl. No.: 11/338,248

(22) Filed: Jan. 23, 2006

(65) Prior Publication Data

US 2007/0174281 A1 Jul. 26, 2007

(51) Int. Cl.
*G06F 17/30* (2006.01)

(52) U.S. Cl. .............. 726/28; 726/29; 713/164; 713/165

(58) Field of Classification Search ........................ None
See application file for complete search history.

(56) References Cited

U.S. PATENT DOCUMENTS 5,729,734 A * 3/1998 Parker et al. ...................... 707/9
2005/0091522 A1* 4/2005 Hearn et al. .................. 713/200
2007/0033191 A1* 2/2007 Hornkvist et al. ................ 707/9

* cited by examiner

*Primary Examiner* — Jung Kim
(74) *Attorney, Agent, or Firm* — Patterson & Sheridan, LLP

(57) ABSTRACT

Embodiments of the invention provide for "cloaked" data objects in an electronic content management system. A "cloaked" data object is one that is inaccessible and unreadable by a user, but one which the user is permitted to know exists. The cloaked object may allow the user to know the scope of use of an object, without revealing the substantive content of the data object. A client application may process the cloaked object in a manner that is no different than manner in which the client processes an uncloaked version of the same data object.

24 Claims, 8 Drawing Sheets

305

Advanced Find

File  Edit  View  Help

Look For                Look In

| Files ▾ | Vault Explorer | Browse |

| Basic | Advanced | Options |

Search for

| Property | Condition | Value |       | Find Now |
| contains ▾ | contains ▾ | steel |    | Stop |
|          |           |       Add  Remove | New |

find items that match these criteria material contains steel 310 brackets the above section.

| ☐ Client File Name | Version Number | Create User Name | Check In Date | Comment |
|---|---|---|---|---|
| ☐ Combo Plate Part ipt | 1 | Administrator | 10/5/2004 4:46 PM | Add Pad Lock |
| ☐ Combo Plate Lower | 1 | Administrator | 10/5/2004 4:46 PM | Add Pad Lock |
| ☐ Combo Plate Upper | 1 | Administrator | 10/5/2004 4:46 PM | Add Pad Lock |
| ☐ Combo Spring ipt | 1 | Administrator | 10/5/2004 4:46 PM | Add Pad Lock |
| ☐ Combo Stand-Off ipt | 1 | Administrator | 10/5/2004 4:46 PM | Add Pad Lock |
| ☐ Case Back ipt | 1 | Administrator | 10/5/2004 4:46 PM | Add Pad Lock |
| ☐ Case Inner ipt | 1 | Administrator | 10/5/2004 4:46 PM | Add Pad Lock |
| ☐ Case Outer ipt | 1 | Administrator | 10/5/2004 4:46 PM | Add Pad Lock |
| ☐ Catch Post ipt | 1 | Administrator | 10/5/2004 4:46 PM | Add Pad Lock |
| ☐ Dial ipt | 1 | Administrator | 10/5/2004 4:46 PM | Add Pad Lock |
| ☐ Lock Shackle ipt | 1 | Administrator | 10/5/2004 4:47 PM | Add Pad Lock |
| ☐ Retainer ipt | 1 | Administrator | 10/5/2004 4:47PM | Add Pad Lock |
| ☐ Combo Backing Plate | 3 | Administrator | 11/1/2004 1:53 PM | Check Prev' |

13 Items ( 0 selected )

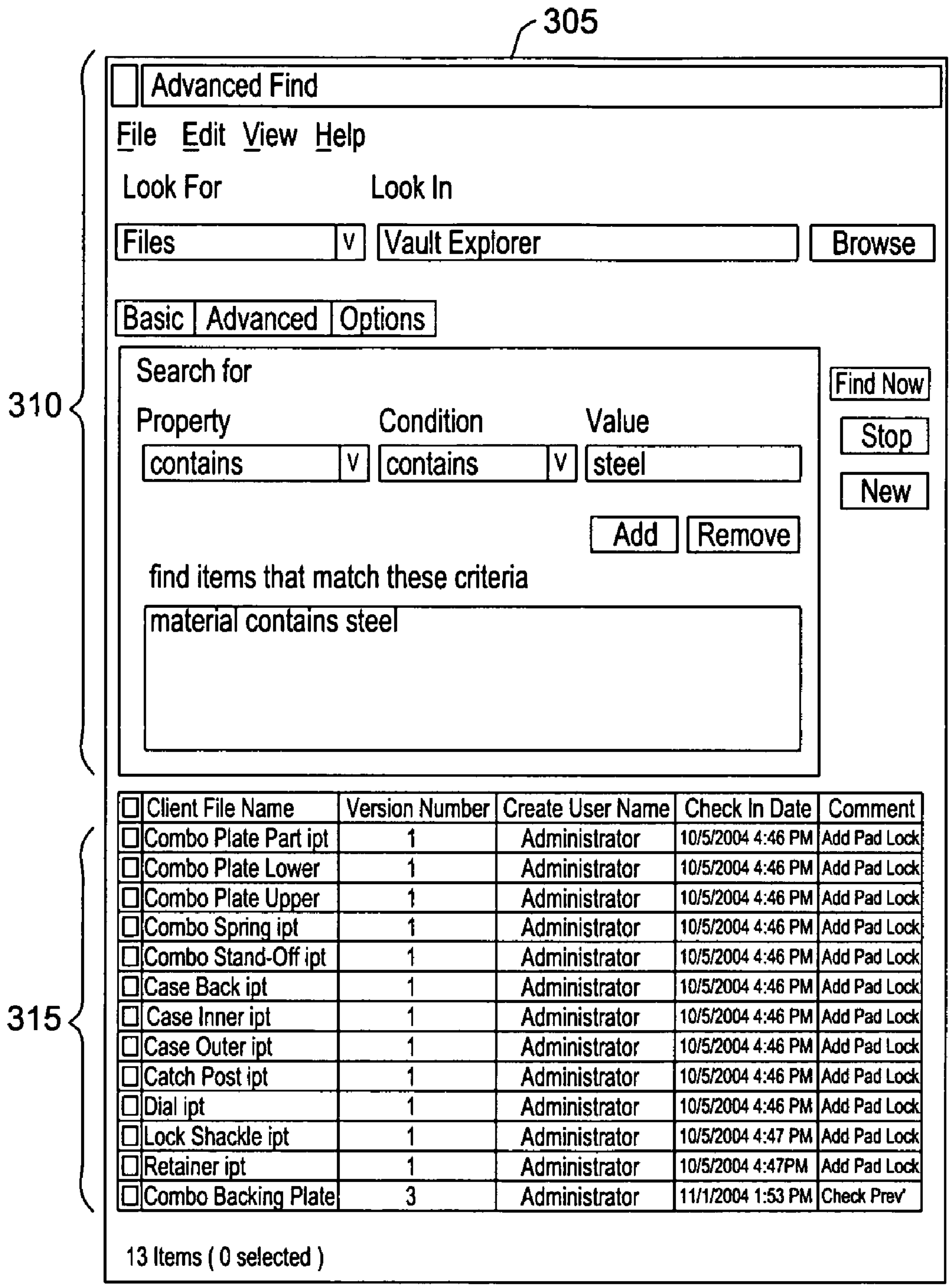

Advanced Find

File   Edit   View   Help

Look For           Look In

| Files  v | Vault Explorer | Browse |

[Basic] [Advanced] [Options]

310 {
Search for

| Property | Condition | Value |
| contains v | contains v | steel |

[Find Now]
[Stop]
[New]

[Add] [Remove]

find items that match these criteria material contains steel

| | Client File Name | Version Number | Create User Name | Check In Date | Comment |
|---|---|---|---|---|---|
| ☐ | Combo Plate Part ipt | 1 | Administrator | 10/5/2004 4:46 PM | Add Pad Lock |
| ☐ | Combo Plate Lower | 1 | Administrator | 10/5/2004 4:46 PM | Add Pad Lock |
| ☐ | Combo Plate Upper | 1 | Administrator | 10/5/2004 4:46 PM | Add Pad Lock |
| ☐ | Combo Spring ipt | 1 | Administrator | 10/5/2004 4:46 PM | Add Pad Lock |
| ☐ | Combo Stand-Off ipt | 1 | Administrator | 10/5/2004 4:46 PM | Add Pad Lock |
| ☐ | Case Back ipt | 1 | Administrator | 10/5/2004 4:46 PM | Add Pad Lock |
| ⊘ | Inaccessable | N/A | N/A | N/A | N/A |
| ⊘ | Inaccessable | N/A | N/A | N/A | N/A |
| ⊘ | Inaccessable | N/A | N/A | N/A | N/A |
| ⊘ | Inaccessable | N/A | N/A | N/A | N/A |
| ⊘ | Inaccessable | N/A | N/A | N/A | N/A |
| ⊘ | Inaccessable | N/A | N/A | N/A | N/A |
| ⊘ | Inaccessable | N/A | N/A | N/A | N/A |

320 { (Combo Plate Part ipt through Case Back ipt)
325 { (Inaccessable rows)

6 Items ( 0 selected ) 7 Cloaked Items

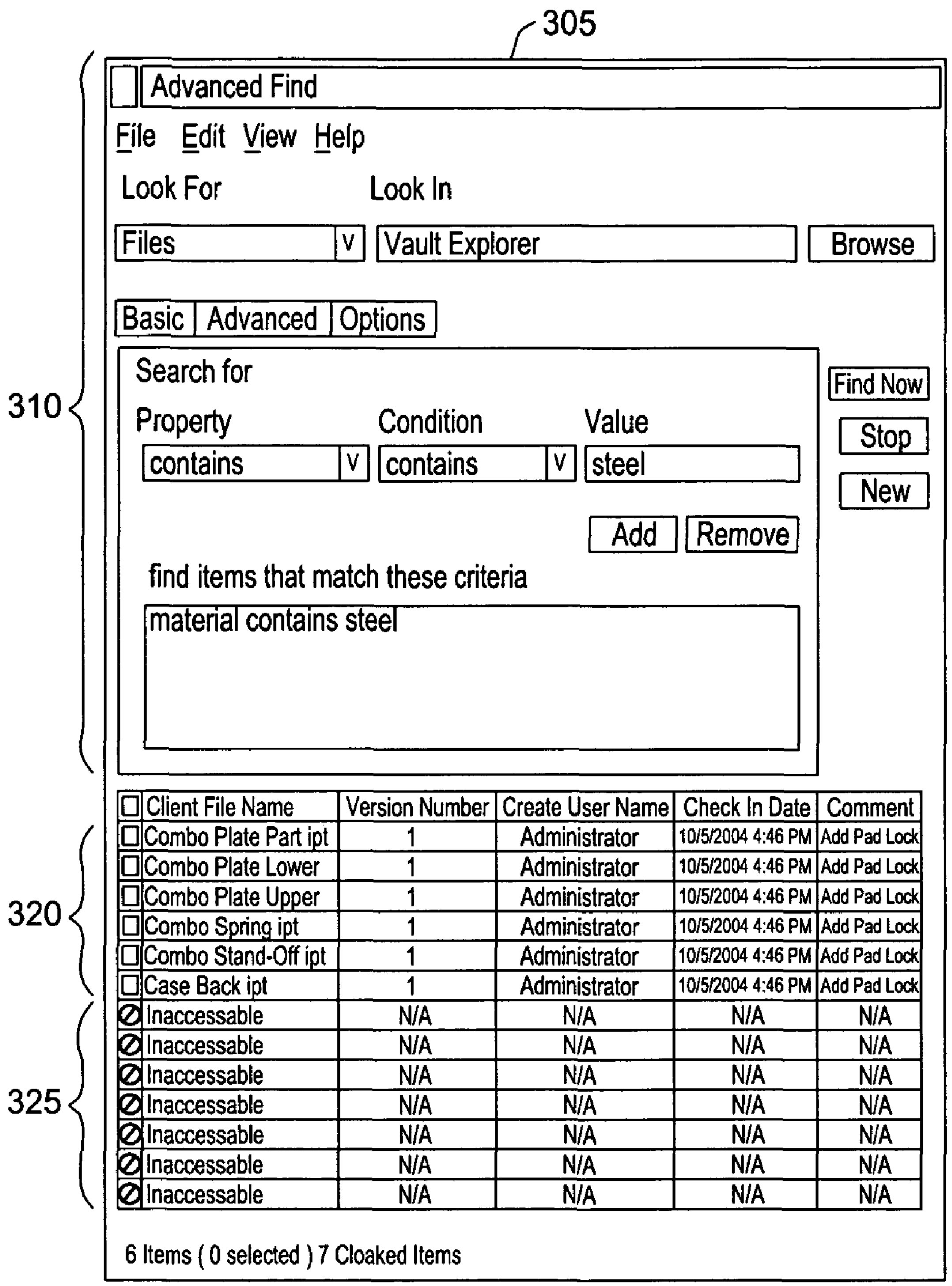

FIG. 3B

CLOAKED DATA OBJECTS IN AN ELECTRONIC CONTENT MANAGEMENT SECURITY SYSTEM

BACKGROUND OF THE INVENTION

1. Field of the Invention

The present invention generally relates to computer systems. More specifically, the present invention relates to techniques for managing access to data objects accessible using an electronic content management system.

2. Description of the Related Art

Computer applications often access data objects stored in databases. An electronic content management system (ECM system) is a computer software application used to manage both electronic and non-electronic documents (e.g., scanned copies of paper documents, photographic or film images, etc.) stored in a database. ECM systems typically allow users to check-in and check-out documents into the system, provide document version control, and allow users to search for documents within the ECM system. Additionally, ECM systems may enforce access controls to protect proprietary information and government secrets, or more simply, to limit access to data objects based on the role or function of an individual within an enterprise. Accordingly, one group of individuals or users of the ECM system may have read and write access to a set of data objects, while a second group of individuals or users will have only read-access or no access at all. Typically, when a user does not have the appropriate access rights to a data object, the ECM system simply does not return any data related to that object.

Handling access denial in this fashion can produce serious practical problems. Consider the following engineering example. Often a designer or manager of an engineering project will begin a new design by considering alterations to a part included in an existing assembly or design. Information regarding the part may be scattered across many projects to which the particular designer or manager may or may not have access. If the designer does not have full access to each project, he may be unable to learn the true extent to which the part is used by the enterprise because, when the designer requests information from the ECM system, he or she simply receives no information related to data objects unless he or she has read-access privileges to the data object. Thus, one drawback to this approach of access control is that it may prevent a person from learning of even the existence of certain data objects managed by the ECM system.

This result may create serious problems as decisions regarding whether a product or part can be redesigned are often based on how many products or assemblies are impacted by a proposed design change. If a designer or manager cannot evaluate how many projects are impacted, he or she may be unable to correctly estimate the cost of changing the part. Similarly, considerations such as whether the part is currently used in another project or whether the part is included in a design or about to be placed in production may be unknown to the designer.

An example of the problem set forth above arises in the use of computer-aided design (CAD) applications to model a complicated machine such as an automobile. The term computer-aided design (CAD) generally refers to a broad variety of computer-based tools used by engineers, architects, and other design professionals. CAD applications may be used to construct computer models representing virtually any real-world construct. Many CAD models not only include visual renderings of products, assemblies, subassemblies, and parts, but also contain information about how the parts fit together, weights, materials, stresses, and forces. Essentially, the CAD model contains computer simulations of the geometry, structure and function of the object being modeled. Often, ECM systems are used to manage access to data objects created using a CAD application. A CAD model of an automobile may include a detailed model of an assembly such as a door. Such an assembly would typically include various subassemblies and parts such as a window, an ashtray, and various leaf parts. Each subassembly may itself include CAD models of primitive parts, such a bolt. The drawing files, models, views, and other data objects representing the car door, and all the related subassemblies may be stored and accessed by the CAD application interacting with an ECM system.

Now, suppose a designer wants to change one of the subassemblies or parts contained in the model of the door. Suppose further that the part is used in a model of a second automobile currently in production. If the designer does not have access to the CAD model of the second automobile, the ECM system will not return any data objects that include information about the second automobile. Therefore, the designer may proceed to change one of the subassemblies or parts of the door for the first automobile without any knowledge that the subassembly or part is currently in use for the second automobile. In many cases, this may be disruptive for designers who do have access to the designs of the second automobile. This problem may be further complicated by using the subassembly or part in several other models of automobiles or even in models in completely different product lines. Generalizing this situation, without broad read-only access, the designer is prevented from learning how many (and which) different projects share a common part or from learning what how one part may be related or integrated with other parts, assemblies or projects.

Accordingly, there remains a need for an ECM system that implements an adequate access control mechanism to prevent the unauthorized or unnecessary disclosure of data that also provides users with information regarding the existence of a object, part or model and/or the relationships between an inaccessible data object and other data objects to which a user has access privileges.

SUMMARY OF THE INVENTION

Embodiments of the invention provide for "cloaked" data objects in an ECM system. A "cloaked" data object is one that is inaccessible and unreadable by a user, but one which a user is permitted to know exists. The cloaked data object may allow the user to know the scope of use of a particular data object, without revealing the substantive content of the cloaked data object. The cloaked nature of data object may be transparent to the operations of a client application, which may process the cloaked data object in a manner no differently then the manner in which it would process an uncloaked counterpart.

One embodiment of the invention includes a method of providing access to data objects in an electronic content management system. The method generally includes receiving a request for access to data objects stored by the ECM system. The request may be submitted by a user interacting with a browser application configured to display the data objects managed by the ECM system. The display may include a hierarchy of related data objects. Alternatively, the user may submit a request using an application configured with an integration plug allowing it to communicate with the ECM system. In either case, to process the request, the ECM system may be configured to generate a set of data objects responsive to the request and to determine whether the requesting user has read-access privileges to the data object. If the user does not have read-access privileges to the data object, the ECM system generates a cloaked version of the data object and provides the client application access to only the cloaked version of the data object. The cloaked version of the data object identifies relationships between the cloaked data object and other data objects in the ECM system, without also exposing the substantive content of the data object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3B are diagrammatic representations of a set of objects displayed on a computer screen, in accordance with the present invention.

DETAILED DESCRIPTION OF THE PREFERRED EMBODIMENTS

Figure 1:
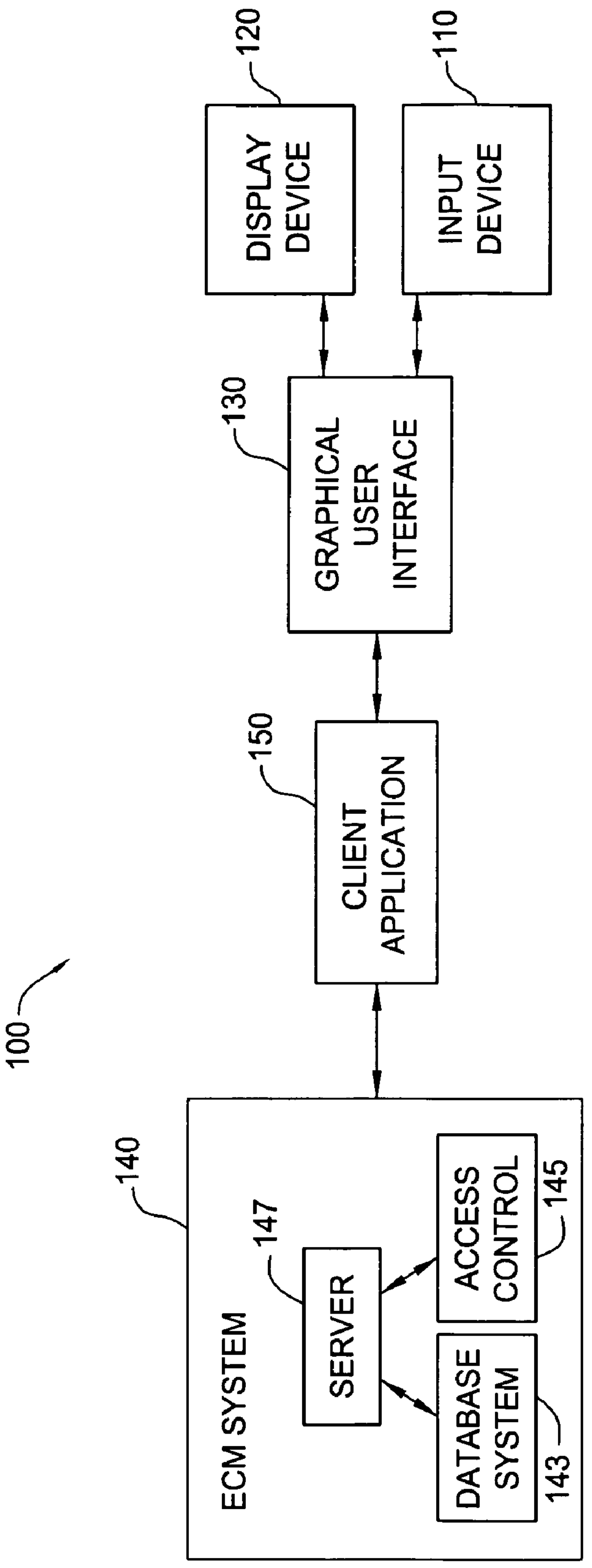
FIG. 1 is a functional block diagram showing a system capable of providing cloaked data objects, in accordance with the invention.

FIG. 1 is a functional block diagram showing a system 100 capable of providing cloaked data objects. The system 100 may include standard computer hardware such as a central processing unit, RAM, ROM, and storage devices (not shown). A user, such as an engineer or manager, may enter a request for data via an input device 110. Input device 110 typically includes a keyboard and mouse pointing device, although other input devices may be used. Users interact with input device 110 to access and control elements of a user interface 120 such as a graphical user interface that includes menus, buttons, drop-down lists, check-boxes and the like. The user receives output information via a display device 130.

The components provided by system 100 may include computer software applications executing on a computer system such as a desktop computer, server, laptop computer, tablet computer, and the like. However, the components illustrated in system 100 are not limited to any particular computing environment, programming language, or computer hardware and/or software combination, and embodiments of the invention may be adapted to take advantage of new computing systems as they become available. Additionally, the components illustrated in FIG. 1 may be present on multiple systems communicating over computer networks including local area networks or wide area networks such as the Internet. For example, the client application 150 may be executing on a client computer communicating with an electronic content management system (ECM system) 140 executing on a networked server computer.

In one embodiment, a user may generate a request for data objects from the ECM system 140. The data objects managed by the ECM system 140 may include text documents, spreadsheets, images, audio/visual data, two- and three-dimensional CAD drawings, etc. The user's request is transferred from the user interface 120 to the ECM system 140. The ECM system 140 may be configured to manage access to data objects stored in a database system 143. As shown, the ECM system 140 includes a computer database system 143, an access control component 145, and a server component 147. The ECM system 140 receives user requests from a client application 150 and returns appropriate data objects to the user in accordance with the access controls stored in the access control component 145.

In one embodiment, the client application 150 is a program running on a computer. The ECM system 140 may provide a client application 150 that allows users to interact with the server component 147. Such a client application 150 may be configured to allow users to browse a display of data objects managed by the ECM system 140, and to check-out, modify, and check-in data objects managed by the ECM system 140. Alternatively, the client application 150 may include a software application with an integration plug-in that allows the client application 150 to generate requests for access to data objects managed by the ECM system 140. For example, the developers of the ECM system 140 may provide application programmer interface (API) allowing users to integrate the functions of a client application 150 with the ECM system 140. A request from a client application 150 to the ECM system 140 may include a query to retrieve a set of data objects manipulated by the particular client application 150 (e.g., drawings manipulated by a CAD program). Relationships between data objects may be presented using a hierarchical collection of folders containing related data objects. Rather than simply not displaying data objects to which the user lacks read-access privileges, the client application 150 may display cloaked data objects in place thereof. The cloaked data objects allow a user to determine the relationships between the cloaked data object and other data objects, but do not provide the user with any of the substantive content of the data object represented by the cloaked data object.

For instance, the client application 150 may comprise a computer-aided design (CAD) application. Such programs allow users to create CAD models that represent structural characteristics or provide a functional simulation related to a design item or product. CAD applications provide users with visual renderings of CAD models or drawings (e.g. a two- or three-dimensional displays of an object), and data regarding assemblies, subassemblies, and parts used to represented by the model. A user may be presented with the data objects that make up a CAD model, with cloaked data objects used to represent data objects for which the user lacks read-access privileges.

The computer database system 143 is configured to store data objects managed by the ECM system 140. For example, the data objects may comprise a set of CAD drawings composed using a CAD application 150 or a set of text documents generated using a word processor. Further, the ECM system 140 may allow users to create a project and specify data objects associated with multiple client applications as part of the project. The computer database system 143 also includes sets of relationships among the objects. Thus, in addition to providing storage for the data objects, the database 143 may store all of the fields associated with a particular object (e.g., a version, a date created, etc, a last modified, a name, location, etc.). The sets of relationships included in the computer database system 143 may include how various objects fit or function together. The relationships may also include information regarding which assemblies, subassemblies, items, or products are included in various projects or manufactured products. For example, the sets of relationships may indicate whether various parts and subassemblies are included in a particular model of automobile currently in production.

The access control component 145 specifies access rights to data or information contained in the database system 143. Since the data or information is stored as data objects, the access rights define whether the user (or a group to which the user belongs) has access to data objects stored in the computer database system 143. The access rights are used to determine users who may access a given data object and the type of access to that data object. Typically, access rights specify whether a user has read-access (the ability to view an object) and/or write access (the ability to modify an object). For example, within an enterprise, one group of individuals may have read and write access to a set of data objects. Simultaneously, another group of individuals may only have read-access to the same set of data objects. Such might be the case for users working in different projects, or different aspects of the same project.

Within the ECM system 140, the server 147 interacts with the client application 150 and with other components of the ECM 140 such as the database system 143 and the access control component 145. The server 147 receives a request for access to data objects stored by the computer database system 143. In response to the request, the server 147 generates a set of data objects. Typically, the server may generate a query to retrieve data objects from database system 143. For each object within the set of data objects, the server 147 identifies whether the user has read-access privileges. In one embodiment, if the user does not have read-access privileges to a particular requested data object, the server 147 generates a cloaked version of that data object and provides the client application 150 with the cloaked version along with other data objects responsive to a request for which the user does have read-access.

Importantly, when the access control settings prevent a user from reading a data object, instead of returning nothing (or failing the operation), a cloaked data object may be returned. In one embodiment, the cloaked data object reveals no substantive information about the corresponding data object. This approach is allows the ECM system 140 to show a user that related data exists, even though no information about the data object is revealed. However, the cloaked data object reveals relationships between itself and other data objects. For example, a cloaked data object may reveal relationships to other data objects such as a parent, child, or peer objects to which the user has read-access privileges.

The client application 150 operates with the cloaked object in a manner that is no different than manner in which the client application 150 operates on the "uncloaked" version of the same data object. Thus, while cloaked to avoid providing the user with substantive information, a data object's cloaked nature is transparent to the client application 150. For all intents and purposes, the cloaked object is the same as any other data object used by the client application 150, but the substantive information is removed from the cloaked data object.

In one embodiment, the cloaked version of a data object may include a set of abstract identifiers consistent with the access rights the user has to other data objects managed by the ECM system 140. The abstract identifiers indicate relationships between the cloaked data object and other data objects managed by the ECM system 140. The cloaked version hides content of the requested data object while simultaneously providing the user with an indication of the existence of the data object through the abstract identifiers. Thus, information that should remain inaccessible remains so, while information regarding the existence of the data object, and its relationship to other data objects managed by the ECM system 140 is provided to the user. For example, if the user submits a query requesting a list of projects that include a particular data object (e.g., a model of a specific part), the response may present a hierarchical display of projects that include the part and to which the user has access as well as a list of cloaked data objects representing projects that include the part, but to which the user does not have read-access privileges.

One should note, however, that the server 147 and the ECM system 140 also return uncloaked versions of the requested data objects. The cloaked version of a requested data object is generated by the server 147 and the ECM system 140 only when the access rights specified in the access control component 145 indicate that the user does not have access privileges to a particular data object. The user may have read access privileges to one or more requested data objects. If the user does not have read access privileges to a first set of requested data objects but has access to a second set of requested data objects, the server 147 and the electronic content management system 140 will return cloaked versions of first set and uncloaked versions of the second.

Figure 2:
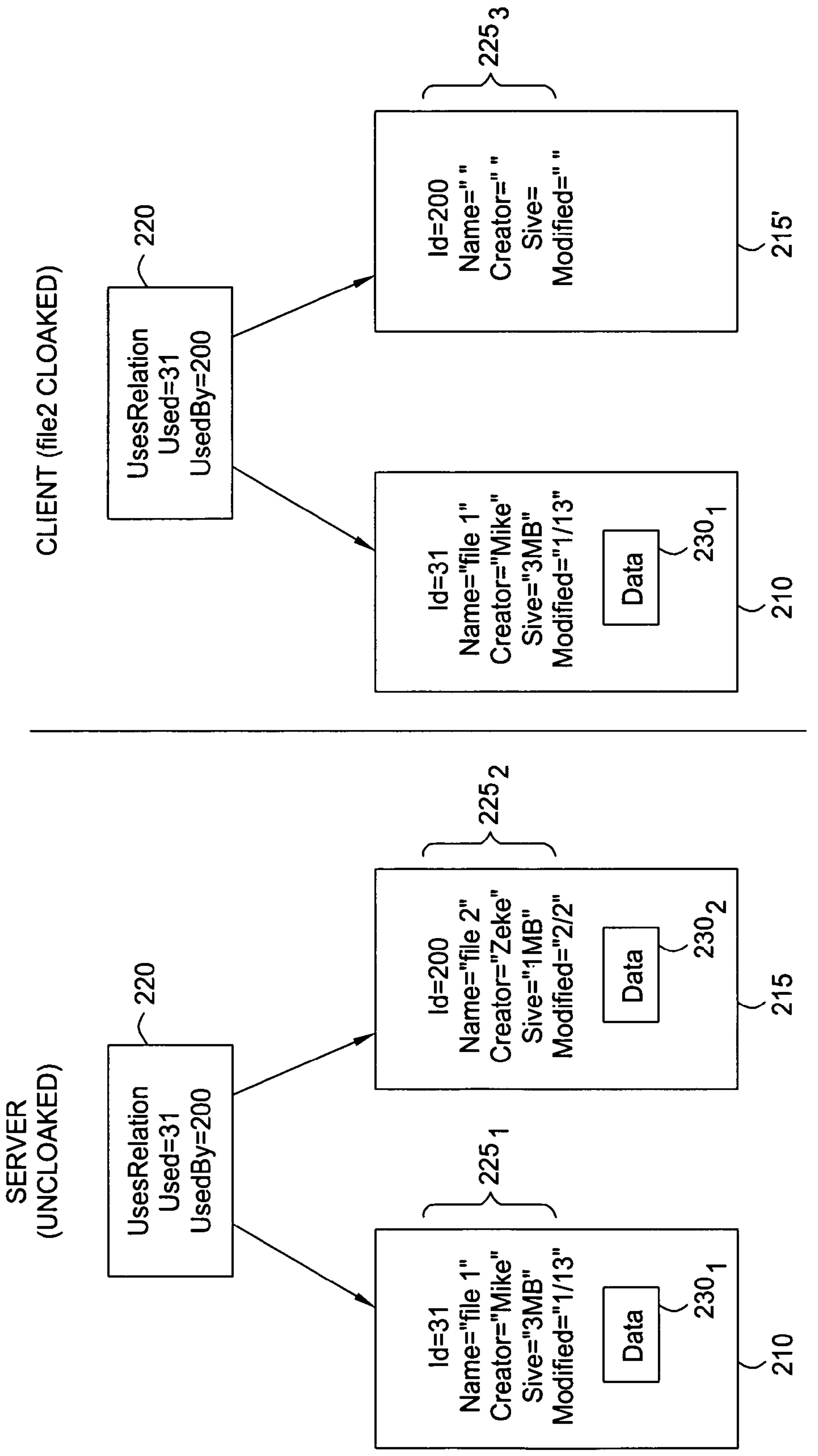
FIG. 2 is a diagrammatic representation of both an uncloaked version and a cloaked version of data object, according to one embodiment of the invention.

FIG. 2 is a diagrammatic representation of both an uncloaked version and a cloaked version of data object, according to one embodiment of the invention. As shown, FIG. 2 illustrates a file 210 and a file 215 related by relationship 220. File 210 includes an "ID" of "31" and metadata $\mathbf{225}_1$ specifying a name, a creator, a size, and a date last modified. File 210 also includes the substantive data content 230, associated with this file. Similarly, file 215 includes metadata $\mathbf{225}_2$ and data content $\mathbf{230}_2$. Relationship 220 shows the relationship between file 210 and file 215. Specifically, relationships 220 shows that the file 210 (with the ID of 31) is used by file 215 (with the ID of 200). Relationship 220 may be a record stored in database system 143. Assume that the user interacting with client application 150 has read access privileges to file 210 but not to file 215 and makes a request to view these files and associated relationships. In response, when file 210 and file 215 are presented to the user, file 215 is presented as cloaked file 215'. Accordingly, the metadata $\mathbf{225}_3$ still includes the ID of "200" for the cloaked file 215', but the remaining metadata $\mathbf{225}_3$ has been removed, as has substantive data content $\mathbf{230}_2$. Preserving the identifiers in the cloaked file 215' allows the client application to inform the user of the relationship of the cloaked objects to the other data objects in the ECM system. At the same time, because the cloaked object 215' includes the ID, and relationship 220 still provides the correct relationships between file 210 and file 215', the client application 150 may still processes the cloaked file 215' no differently than it would any if provided the uncloaked version (i.e., file 215).

Figure 3C:
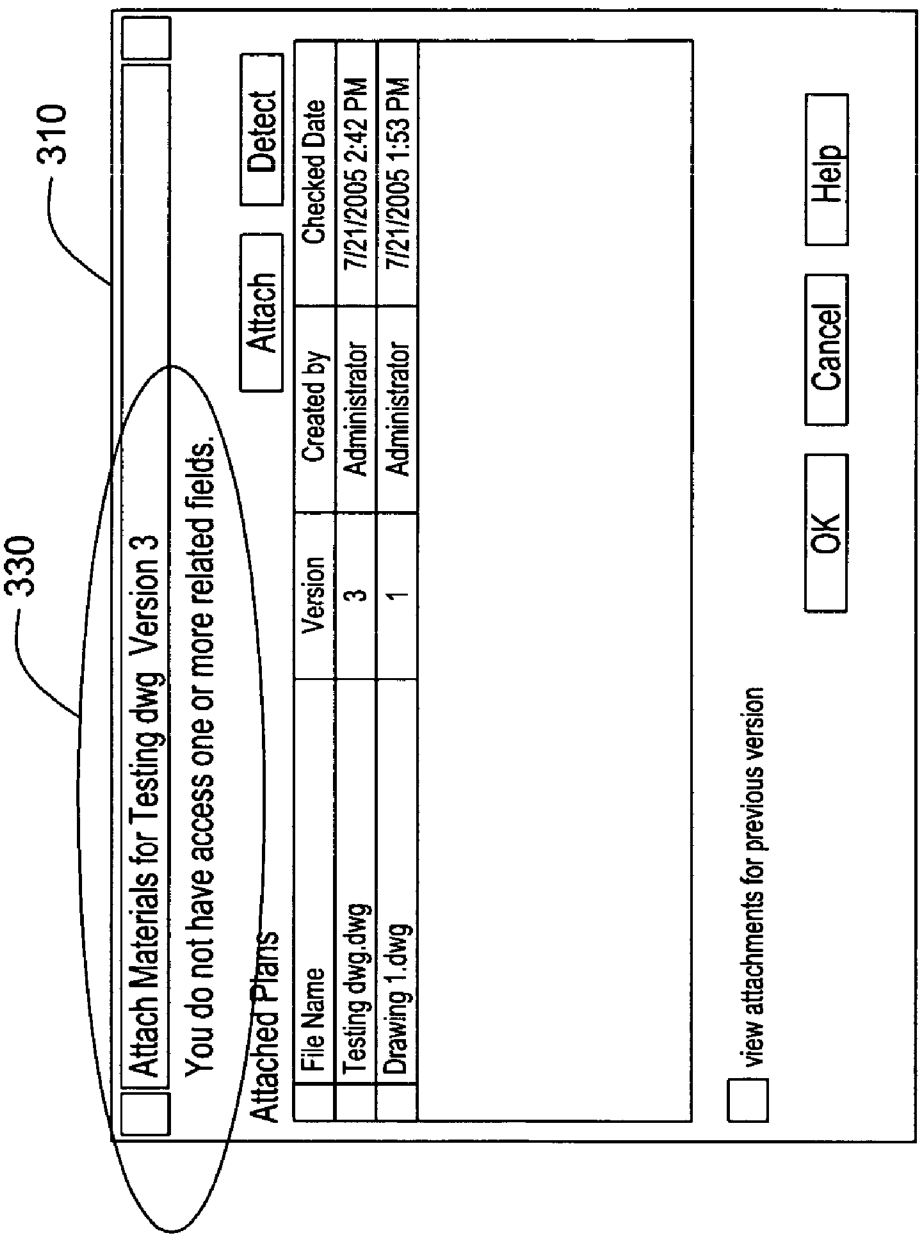
FIG. 3C is a diagrammatic representation of at least one cloaked data object displayed on a computer screen, in accordance with the present invention.

The client application 150 may be configured to process a cloaked data object like file 215' in a variety of ways. In one embodiment, both a cloaked and an uncloaked data object may be indistinguishable from one another by the client application 150, which treats both the same. Alternatively, a cloaked data objects may indicate that it is cloaked, allowing the client application 150 to inform the user that a particular data object is cloaked, but otherwise still treat the cloaked data object the same as an uncloaked counterpart. Similarly, the client application 150 may use the cloaked indication to alter the display of the cloaked object itself. For example, by using a designated icon, or by replacing the empty data fields (e.g., metadata 225$_3$) with values to draw the user's attention to the presence of a cloaked data object. Examples of the latter alternative are illustrated in FIGS. 3A-3C.

FIG. 3A illustrates a diagrammatic representation of data objects returned in response to a user request. As shown, a screen 305 on the display device 120 sets forth data objects consistent with a set of conditions 310 specified by a user. In this example, the user is seeking all data objects in a project that include a property attribute of "material" that contains the value "steel." Such a query could be used to identify, for example, all the components of an automobile door made from steel alloy. None of the data objects 315 are cloaked in FIG. 3A because the particular user has read-access privileges to all the data objects responsive to conditions 310.

Similarly, FIG. 3B is a diagrammatic representation of cloaked data objects 325 returned in response to a user request. As shown, a screen 305' on the display device 120 sets forth data objects consistent with a set of conditions 310'. Note the conditions in 310' in screen 305' are identical to conditions 310 in view 305. In this example, the user has read-access privileges to data objects 320. However, the user does not have read-access to seven of the data objects shown in FIG. 3A. Since the user does not have access to these data objects, the screen 305' shows these data objects having been replaced with cloaked data objects 325. As shown, the cloaked data objects 325 are displayed in the results of the view 305' using the text label "inaccessible object." Further, the attributes of the cloaked data objects 325 are shown as "N/A." However, because the cloaked data objects 325 are responsive to conditions 310', the user learns of the existence of these seven data objects. At the same time, the cloaked data objects 325 do not reveal the substantive content regarding their "uncloaked" counterparts. From the cloaked data objects 325, a designer may determine the extent that a proposed change may impact a given enterprise, without providing access to data objects that the designer lacks read access privileges.

In another embodiment, the server 147 may return an indication of the existence of data objects to which the user does not have access. For example, FIG. 3C is a diagrammatic representation of a view displayed on a display device 120. In this example, the user has access to Testing.dwg.dwg and Drawing_1.dwg. However, the user does not have access to other, related data objects. Since the user is not being presented with a complete view of available data objects, he receives a notice 330. Thus, the user is alerted that the access rights contained in the access control component 145 prevent the user from accessing data objects related to the ones the user has access to.

Figure 4:
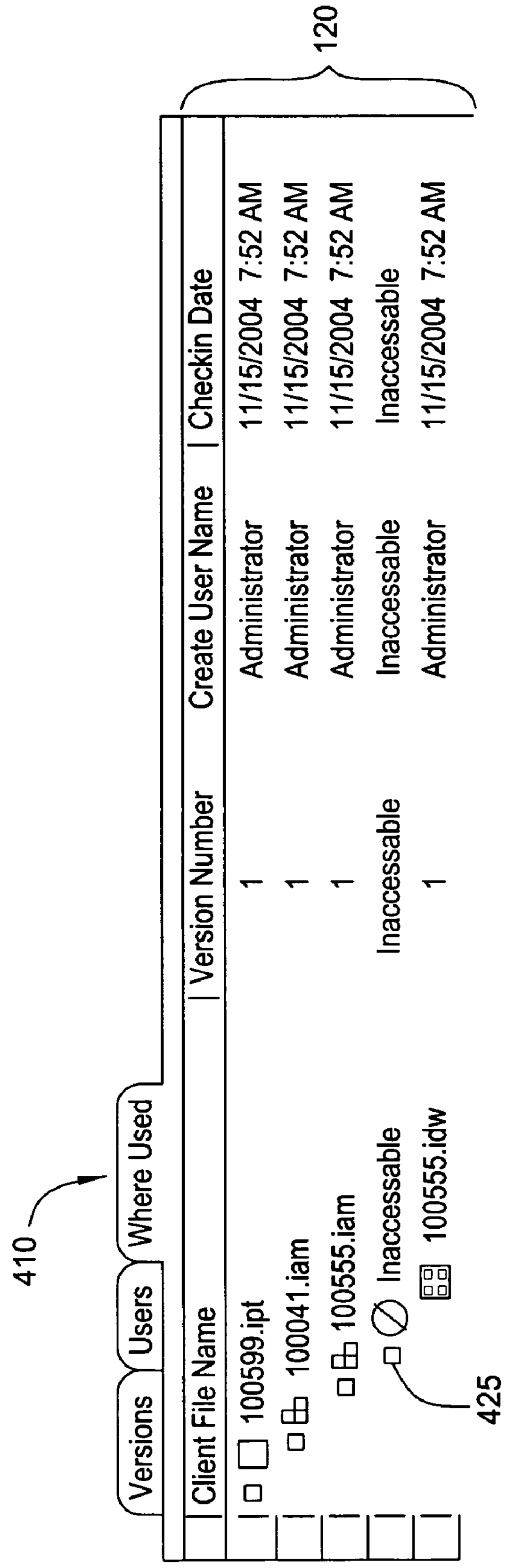
FIG. 4 is a diagrammatic representation of a cloaked data object displayed on a computer screen for an inaccessible path, in accordance with the invention.

FIG. 4 is a diagrammatic representation of a hierarchical display of data objects, in accordance with an embodiment of the invention. As shown, the view on the computer display 120 includes a hierarchy 410 of data objects 410. The hierarchy 410 includes a data object labeled 100555.idw to which the user has read-access privileges. However, the user does not have read access privileges to the parent of this data object. Similarly, the hierarchy 410 includes a data object named 100555.iam. This object is the parent of cloaked data object 425. Illustratively, the cloaked data object 425 is displayed using a label that reads "inaccessible." Without exposing the substantive information from the cloaked data object, the user may learn of the existence of the cloaked data object 425 and may also learn how the cloaked data object 425 is related to other data objects that the user does have read access privileges (namely, data objects 100555.idw and 10555.iam). Thus, the user is aware that there are one or more objects that may be affected by a change to the 10055.iam data object even though substantive data regarding cloaked data object 425 is not provided.

Figure 5:
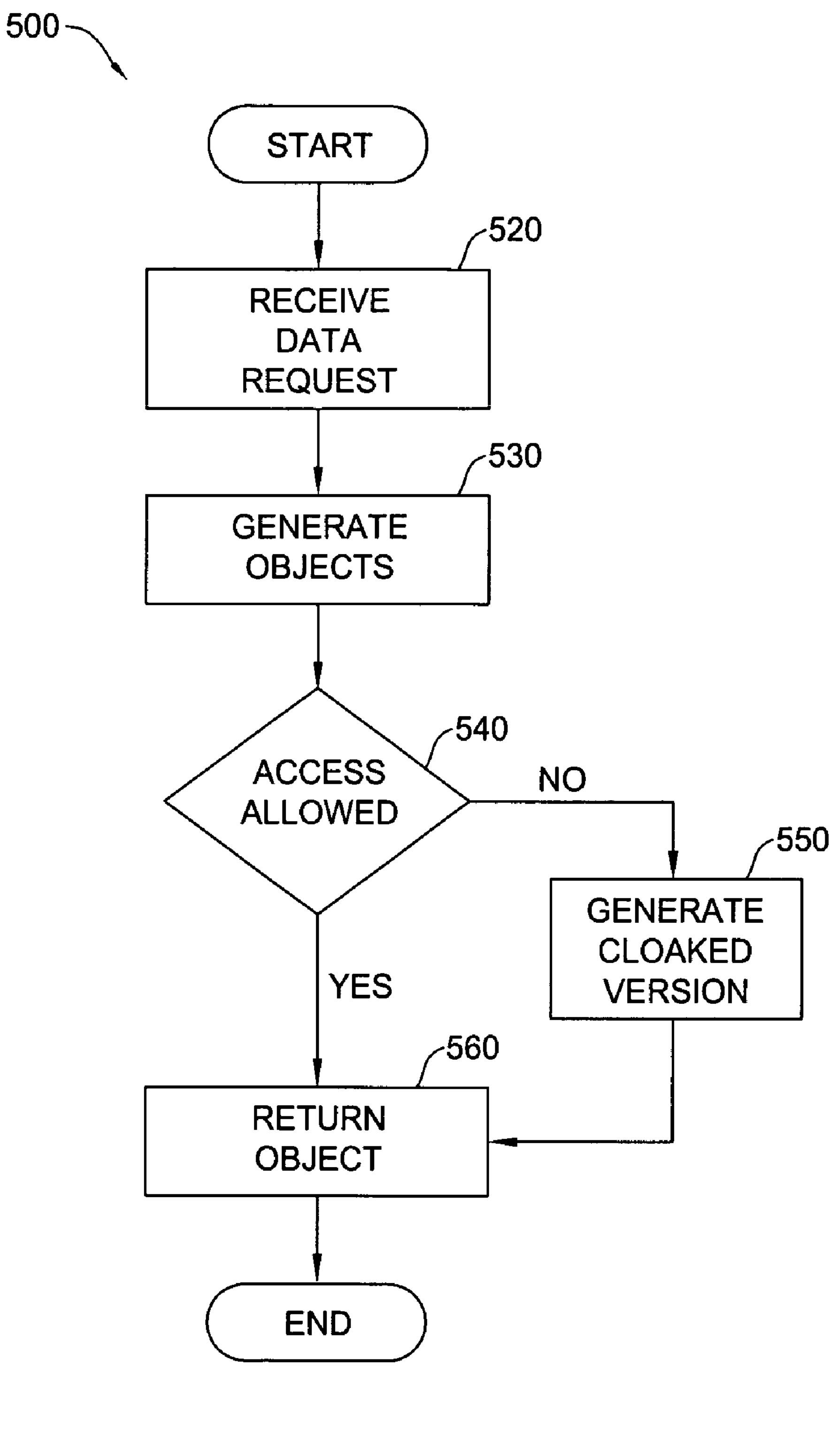
FIG. 5 is a flowchart illustrating a method for providing access to data objects, in accordance with the present invention.

FIG. 5 is a flowchart illustrating an embodiment of a method 500 for providing access to data objects in an ECM system 140, according to one embodiment of the invention. Although the method 500 is described in conjunction with elements of the system 100 of FIG. 1, Persons skilled in the art will understand that any system configured to perform the method steps illustrated in FIG. 5, in any order, is within the scope of the present invention.

The method begins at step 520 where the ECM system 140 receives a request to access data objects stored in the ECM system 140. This request may come from the user directly via the input device 110 or the request may be generated by the client application 150 running on the computer. At step 530, the ECM system 140 generates a set of data objects in response to the request. At step 540, the ECM system 140 determines whether the user has read-access privileges to each data object included in the set of data objects. If the user does not have read-access privileges to a particular data object, then the ECM system 140 generates a cloaked version of that data object (step 550). The ECM system 140 returns the cloaked version of the data object at step 560. Otherwise, if the ECM system 140 determines that the user has read-access privileges to the data object, then the unaltered version of the data object is returned (step 560).

In one embodiment, the cloaked data object is returned to the client application 150. The cloaked version of the data object may be displayed to the user on the display device 120 via the user interface 130 as an inaccessible object (e.g., as described above in conjunction with FIGS. 3 and 4). If the user has read-access privileges to a requested data object, the ECM system 140 provides the client application 150 access to the substantive data object stored in the database system 143. For example, in such instances, the data object returned to the client application 150 may be displayed on display device 120 and manipulated by the user via the user interface 130. After evaluating each of the data objects generated at step 530, the method 500 ends at step 570.

Figure 6:
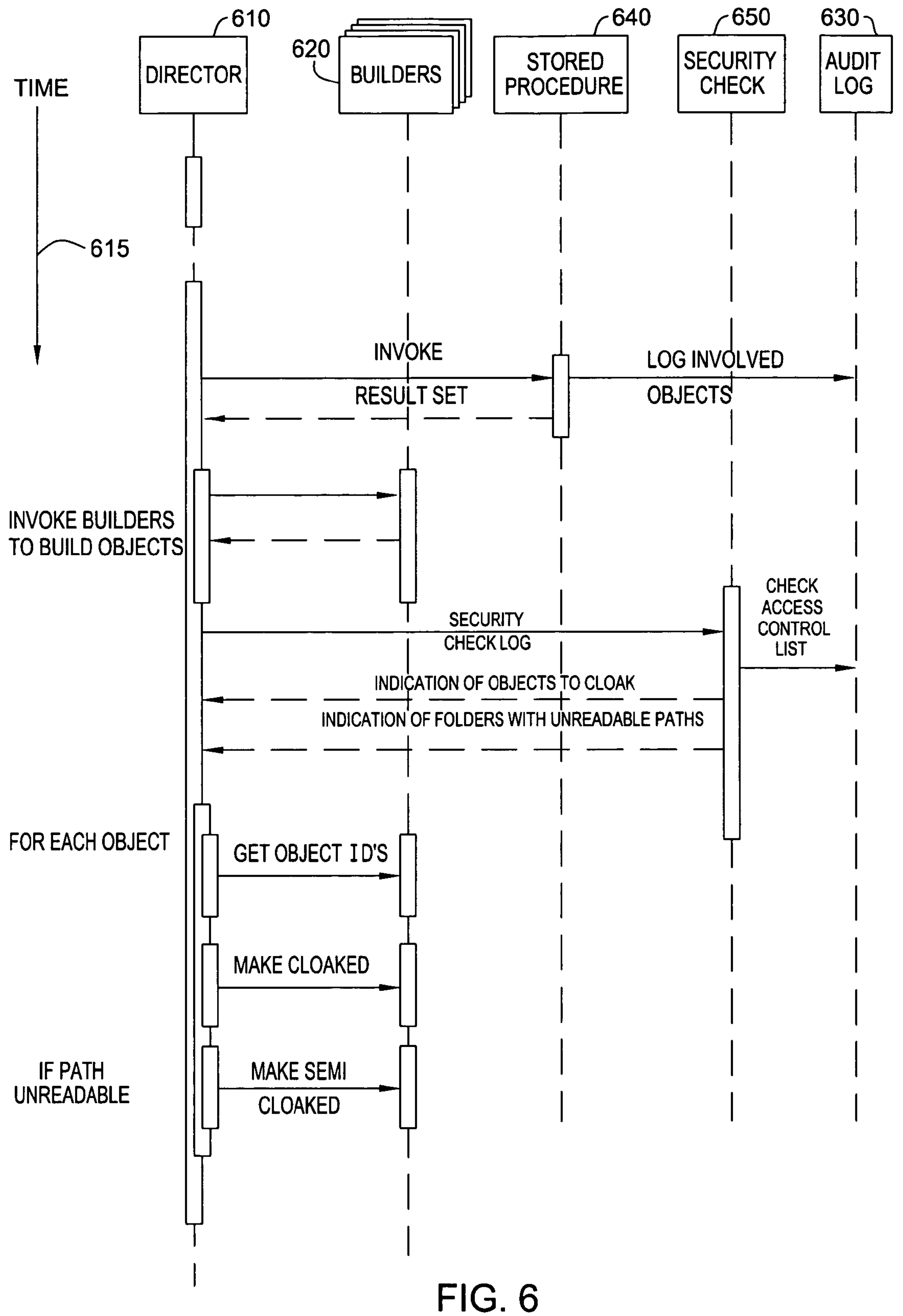
FIG. 6 is a diagrammatic representation of process flow for providing a set of data objects in response to a user request, in accordance with the present invention.

FIG. 6 is a diagrammatic representation of a process flow for providing a set of data objects in response to a user request. More specifically, FIG. 6 illustrates an embodiment of the invention configured to use a software pattern known as a director pattern. As one skilled in the art will recognize, the director pattern is a software design pattern used to enable a variety of data objects to be generated from a common interface. The director pattern includes a director 610 and one or more builders 620. The pattern of the director 610 and builder 620 separates the operations used to construct a complex object or set of objects from the type of object being built. Separating these operations allows similar or identical construction processes to be used to create many different types of data objects. The director 610 is used to control and coordinate the building of data objects, and the builder 620 performs operations to actually build the data objects. In one embodiment the director 610 and builder 620 may represent programmatic classes or modules included with an ECM system 140 and client application 150 (including any applications communicating with server 147 using an ECM integration plug-in).

Diagram 600 shows the programmatic actions of the builder 610 to generate data objects, to generate cloaked data objects, and to return both cloaked and uncloaked data objects to a user. In FIG. 6, time flows downward, as indicated by arrow 615. Within this flow, the director 610 first invokes a stored procedure 640. The stored procedure 640 returns information regarding which data objects need to be built in order to respond to a client request. If the ECM system 140 stores data objects for multiple client applications 150, then a stored procedure 640 may be available for each such client application 150 or for multiple functions of a particular client application 150. Among other things, the director may request a set of data objects to process a query submitted by a user or to display a list of files and folders in a hierarchy.

The stored procedure 640 returns a set of identifiers (e.g., part of file metadata 225 of FIG. 2) associated with a set of data objects. Additionally, the stored procedure 640 may invoke a logging mechanism to record what objects have been requested. For each data object requested by the user, the director 610 invokes the appropriate builder 620, which builds the requested data object. The director 610 may also be configured to invoke a security check procedure 650 to determine whether the user has read-access privileges to each requested data object returned by the stored procedure 640 and built by one of the builders 620. In one embodiment, the security check 650 uses an access control list to determine whether a particular user has read access privileges to a data object. The security check procedure 650 then logs in the audit log 630 that the objects has been checked against the access rights stored in the access control component 145. The security check procedure 650 sends an indication to the director 610 whether a particular data object should be cloaked, or whether elements of a path to the data object should be cloaked.

If the security check 650 indicates that a user does not have read access privileges to the data object, the director 610 sends an instruction to the builder 620 to cloak that object. Similarly, if showing a particular object to the user will reveal the name or existence of a path to which the user lacks read access privileges, then the director 610 sends a message to the builder 620 to cloak that portion of the path to the data object. Then the director 610 then returns the data object either in an original or cloaked version.

Advantageously, cloaking data objects to which the user does not have read access privileges protects information from unwanted disclosure. At the same time, cloaking a particular data object allows the user to still be informed of the relationships between the cloaked object and other objects for which the user does have read access privileges. Further, the cloaked nature of data object may be transparent to the operations of a client application 150, which may process the cloaked data object in a manner no differently then the manner in which it would process an uncloaked counterpart.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be within the scope of the following claims.

What is claimed is:

1. A method of providing access to data objects in a database system, comprising:

receiving a request to access data objects stored by the database system;

generating a set of data objects in response to the request;

for each data object in the set of data objects:

determining whether a requesting entity has read-access privileges to the data object; and if the requesting entity does not have read-access privileges to the data object, generating and displaying a cloaked version of the data object, wherein the cloaked version of the data object displays a set of child and parent relationships between the cloaked data object and other data objects managed by the database system without exposing a data content of the data object; or if the requesting entity does not have read-access privileges to the data object, providing the client application access to the data object.

2. The method of claim 1, wherein the requesting entity comprises a software application configured with an integration plug-in allowing the software application to generate the request to access the data objects stored by the database system.

3. The method of claim 2, wherein the step of generating the set of data objects in response to the request comprises generating data objects in a format used by the software application.

4. The method of claim 1, wherein the request comprises a query to retrieve the set of data objects, wherein the set of data objects generated in response to the request is consistent with selection conditions specified by the query.

5. The method of claim 1, wherein the data objects and the set of relationships among the data objects are presented to a user as hierarchical collection of folders containing the data objects, wherein each data object returned to the requesting entity is presented as an element in at least one folder.

6. The method of claim 5, wherein at least a portion of a path to one of the data objects through the hierarchical collection of folders is cloaked.

7. The method of claim 1, wherein the step of determining whether the requesting entity has read-access privileges to the data object comprises accessing an access control list that specifies access rights associated with each data object stored by the database system.

8. The method of claim 1, wherein the database system includes an electronic content management system configured to manage access to the data objects stored by the database system.

9. The method of claim 7, wherein the electronic content management system includes a director object configured to generate the set of data objects in response to the request by invoking a builder object.

10. A non-transitory computer-readable medium containing a program which when executed by a processor, performs an operation for providing access to data objects in a database system, including the steps of:

receiving a request to access data objects stored by the database system;

generating a set of data objects in response to the request;

for each data object in the set of data objects:

determining whether a requesting entity has read-access privileges to the data object; and if the requesting entity does not have read-access privileges to the data object, generating and displaying a cloaked version of the data object, wherein the cloaked version of the data object displays a set of child and parent relationships between the cloaked data object and other data objects managed by the database system without exposing a data content of the data object; or if the requesting entity does not have read-access privileges to the data object, providing the client application access to the data object.

11. The non-transitory computer-readable medium of claim 10, wherein the requesting entity comprises a software application configured with an integration plug-in allowing the software application to generate the request to access the data objects stored by the database system.

12. The non-transitory computer-readable medium of claim 11, wherein the step of generating the set of data objects in response to the request comprises generating data objects in a format used by the software application.

13. The non-transitory computer-readable medium of claim 10, wherein the request comprises a query to retrieve the set of data objects, wherein the set of data objects generated in response to the request is consistent with selection conditions specified by the query.

14. The non-transitory computer-readable medium of claim 10, wherein the data objects and the set of relationships among the data objects are presented to a user as hierarchical collection of folders containing the data objects, wherein each data object returned to the requesting entity is presented as an element in at least one folder.

15. The non-transitory computer-readable medium of claim 14, wherein at least a portion of a path to one of the data objects through the hierarchical collection of folders is cloaked.

16. The non-transitory computer-readable medium of claim 10, wherein the step of determining whether the requesting entity has read-access privileges to the data object comprises accessing an access control list that specifies access rights associated with each data object stored by the database system.

17. The non-transitory computer-readable medium of claim 10, wherein the database system includes an electronic content management system configured to manage access to the data objects stored by the database system.

18. The non-transitory computer-readable medium of claim 17, wherein the electronic content management system includes a director object configured to generate the set of data objects in response to the request by invoking a builder object.

19. A system for providing access to data objects in a database system, the system comprising:

a memory containing instructions; and a processor configured to execute instructions for performing the steps of:

receiving a request to access data objects stored by the database system;

generating a set of data objects in response to the request;

for each data object in the set of data objects:

determining whether a requesting entity has read-access privileges to the data object; and if the requesting entity does not have read-access privileges to the data object, generating and displaying a cloaked version of the data object, wherein the cloaked version of the data object displays a set of child and parent relationships between the cloaked data object and other data objects managed by the database system without exposing a data content of the data object; or if the requesting entity does not have read-access privileges to the data object, providing the client application access to the data object.

20. The system of claim 19, wherein the requesting entity comprises a software application configured with an integration plug-in allowing the software application to generate the request to access the data objects stored by the database system.

21. The system of claim 19, wherein the data objects and the set of relationships among the data objects are presented to a user as hierarchical collection of folders containing the data objects, wherein each data object returned to the requesting entity is presented as an element in at least one folder.

22. The system of claim 21, wherein at least a portion of a path to one of the data objects through the hierarchical collection of folders is cloaked.

23. The system of claim 19, wherein the database system includes an electronic content management system configured to manage access to the data objects stored by the database system.

24. The system of claim 23, wherein the electronic content management system includes a director object configured to generate the set of data objects in response to the request by invoking a builder object.

* * * * *